US006654222B2

United States Patent
Jüngst et al.

(10) Patent No.: US 6,654,222 B2
(45) Date of Patent: Nov. 25, 2003

(54) CURRENT LIMITER WITH ELECTRIC VALVES FOR LIMITING THE SHORT-CIRCUIT CURRENT IN AN ELECTRIC POWER CIRCUIT

(75) Inventors: Klaus-Peter Jüngst, Stutensee (DE); Grigory Kuperman, Karlsruhe (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 192 days.

(21) Appl. No.: 09/902,352

(22) Filed: Jul. 10, 2001

(65) Prior Publication Data

US 2002/0003687 A1 Jan. 10, 2002

Related U.S. Application Data

(63) Continuation-in-part of application No. PCT/EP00/00626, filed on Jan. 27, 2000.

(30) Foreign Application Priority Data

Jan. 28, 1999  (DE) .......................... 199 03 292

(51) Int. Cl.$^7$ ................................ H02M 5/42
(52) U.S. Cl. .................. 361/93.9; 363/49; 323/908
(58) Field of Search .................. 361/57, 58, 78, 361/87, 91.7, 93.9; 363/49, 131, 132; 323/908

(56) References Cited

U.S. PATENT DOCUMENTS

| 3,099,789 A | | 7/1963 | Perrins | |
|---|---|---|---|---|
| 4,333,134 A | * | 6/1982 | Gurwicz | ............. 363/132 X |
| 4,843,515 A | * | 6/1989 | Richman | ............. 361/58 |

* cited by examiner

Primary Examiner—Jessica Han
(74) Attorney, Agent, or Firm—Klaus J. Bach

(57) ABSTRACT

In a current limiter with electric valves for limiting a short circuit in an electric power supply, wherein two throttles are connected in series and in a parallel path with two series-connected valves, which are disposed in opposition to each other and the two parallel paths are interconnected by a connection extending between the common potential point of the valves and that of the throttles, the valves are semi-controlled valves, which, for the operation of the current limiter, are activated by an external control whereby the valves are converted from a conductive to a blocking state in which they remain so that the current limiter automatically limits the current upon the occurrence of a fault current exceeding a predetermined current threshold.

4 Claims, 4 Drawing Sheets

CURRENT LIMITER WITH ELECTRIC VALVES FOR LIMITING THE SHORT-CIRCUIT CURRENT IN AN ELECTRIC POWER CIRCUIT

This is a continuation-in-part application of international application PCT/EP00/00626 filed Jan. 27, 2000, and claiming the priority of German application 199 03 292.0 filed Jan. 28, 1999.

BACKGROUND OF THE INVENTION

The invention relates to a current limiter for limiting the short-circuit currents in electric power supply circuits.

In electric power nets, warm (normal temperature) reactors as well as superconductive throttles are used for limiting the current.

A current limiter is activated by providing an ohmic resistance, an inductivity or a suitable combination of the two upon the occurrence of a short circuit. Preferably, the short circuit current is limited by an element that can be triggered in a passive manner, that is, a fault current limiter (FLC).

Superconductors are particularly suitable for that purpose since, during normal operation, they have only a small voltage loss and the transition to normal conductivity results in the establishment of a high electric resistance and causes a high magnetic flux. This can be utilized for a resistive or, respectively, inductive current limiting function (see Prof. Dr. techn. P. Komarek, "Hochstromanwendung der Supraleitung", 1995).

A superconductor is not without losses when operated with alternating current. In principle, there are always two loss mechanisms effective, that is, eddy current losses in the matrix and transition magnetic losses ("hysteresis losses") in the hard superconductor itself. With DC operation, the losses in the superconductor are very low.

In the literature, a current limiter is known whose superconductive impedance is switched by way of rectifiers on the direct current side (Boenig, H. J., and D. A. Paice, 1983, Fault Current Limiter using a Superconducting Coil, IEEE Transactions on Magnetics, Vol. 19, no. 3, p 1051, May). A voltage source is connected at the direct current side in series with the impedance. The voltage source ensures the flowing of a current $I_0$ in the impedance. The value of the current $I_0$ exceeds the amplitude of the alternating current, which flows through the limiter as long as there is no fault but is substantially smaller than a short circuit current. The bridge also permits the load current to flow. In this case, the voltage drop across the limiter equals the voltage drop across the valves in the two branches of the bridge.

In U.S. Pat. No. 3,099,789 or, respectively, FR-No. 1,337,971, an electric circuit is presented which consists of a load, which is connected to an electric energy supply by way of a protective circuit. The protective circuit limits current changes in order to moderate a current change in the load. The protective circuit consists of two conductivities arranged in series and disposed in a parallel circuit with two uncontrolled valves, that is diodes, arranged in series and in opposition to each other. The common points of the diodes and the inductivities are directly connected with one another.

Uncontrolled valves block only currents, which are greater than the response current of the protective device, that is the initial current in the inductivities, and direct the excess currents through the inductivities. The smaller currents, which are also present with alternating currents, are permitted to pass almost uninhibited through the diodes (diode resistance in passing direction). The current flowing through the inductivities cannot follow the net current, which becomes again smaller after the current maximum since it is short-circuited by the diodes and remains essentially constant at the value reached.

The consideration of each following half-wave is divided into currents below the response current and currents above the response current. Smaller currents pass through the conductive diode, whereas the higher currents flow through the inductivities and increase the currents already present in that path. This is repeated with each half-wave for the respective effective part of the circuit. In a short circuit situation, this results in an essential increase of the current flow through the inductivities and in the outer circuits during the time interval which is needed for the shut down of the device (100–150 ms) and particularly during the time interval which is required for securing the selective response of the protective device (1–2 sec).

With the use of active semi-controlled valves such as thyristors in the bridge circuit, the short circuit currents is limited more effectively (Boenig, H. J., and D. A. Paice, 1983, Fault Current Limiter using a Superconducting Coil, IEEE Transactions on Magnetics, Vol. 19, no. 3, p 1051, May; FR-No. 1,337,971). However, in this case, a special apparatus is required which is capable of identifying a short circuit and which changes the control algorithms for the thyristors in the bridge. Consequently, this is not a safely operating current limiter with passive triggering as it is desirable for the present invention. The current limiter is, in this case, not an element that is automatically, passively triggered. The current limiter requires a special control unit for being switched off which substantially reduces the reliability of the current limiter.

During a fault, that is, when the amplitude of the alternating current exceeds the value of $I_0$ of the throttle, the short circuit current is limited by the inductivity of the throttle. The limit for the short circuit current is determined by the value of the maximum energy, which is stored in the throttle during the transient process:

$$W_{max} = L * I_{max}^2 / 2$$

For optimizing the current limiter, the energy ($W_{max}$) stored in the throttle is to be minimized.

It is the object of the present invention to provide a simple current limiter which safely limits the short circuit current in the first 100–150 msec as well as in the following 1 to 2 seconds which is essential for the selectivity of activating the protective device. In short, the response time of the current limiter is to be reduced.

SUMMARY OF THE INVENTION

In a current limiter with electric valves for limiting a short circuit in an electric power supply, wherein two throttles are connected in series and in a parallel path with two series connected valves, which are disposed in opposition to each other and the two parallel paths are interconnected by a connection extending between the common potential points of the valves and that of the throttles, the valves are semi-controlled valves, which for the operation of the current limiter are activated by an external control whereby the values are converted from a conductive to a blocking state in which they remain so that the current limiter automatically limits the current upon the occurrence of a fault by which a predetermined current threshold is exceeded.

In a fault situation, that is, when the current exceeds a predetermined value above a design value, the current limiter automatically switches from a conductive to a blocking state without being activated by additional external control signals and it remains in that state.

The two valves may be semi-controlled valves such thyristors.

Preferably, a voltage source is disposed in the connection between the common potential connection of the valves and that of the throttles.

A controllable voltage source is arranged in the respective circuit, which is formed by the inductivity with a valve disposed in a parallel arrangement.

The current limiter is advantageous because, in the event of a short circuit, it is passively triggered limiting the short circuit current during the first 100–150 ms as well as in the following 1–2 sec. In the event of a short circuit, the current is limited by the inductive resistance of the throttles arranged in the alternating circuit. During normal operation, the voltage drop across the current limiter corresponds practically to the voltage drop across the valves.

With the use of semi-controlled valves such as thyristors, the short circuit current is automatically limited without external control signals. Semi-controlled valves change the function of the circuit significantly: After the occurrence of a short circuit, they automatically block within the duration of one or several periods of the alternating current and remain blocked up to the complete shutdown of the faulty circuit. This ensures an effective limitation of the net current by two throttles arranged in series independently of their size and at all times.

Fully controlled valves such as transistors require a special control circuit. They need a separate control circuit, which is involved and also expensive.

During normal operation, a quasi-DC current flows through the current limiting throttles. This results in minimal losses in these elements.

The current limiter according to the invention has the following advantages:

Small size;
Small power net and internal resistance and small short circuit currents;
The arrangement and operating means need to be dimensioned for only small short circuit currents;
Substantial increase of the reliability of the current limiter;
Increased life of the plants and operating means;
Low effects at the fault location;
Increased effectiveness in limiting short circuit currents;
Low losses during normal operation.

Below, the invention will be described in greater detail on the basis of the accompanying drawings.

Figure 1:
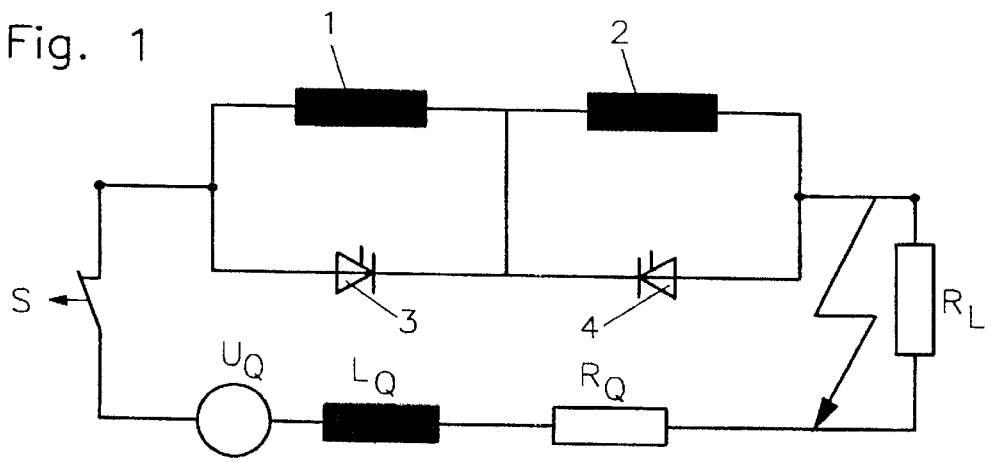
FIG. 1 shows a current limiter circuit in principle.

Well-known features such as a protection circuit and electronic control means associated therewith are not shown in the drawings to facilitate the understanding of the invention.

DESCRIPTION OF A PREFERRED EMBODIMENT

The operation of the invention, in principle, is explained on the basis of an arrangement including thyristors as semi-controlled valves 3 and 4.

Upon activation of the current limiter, the thyristors 3 and 4 are activated and the current through the throttles 1 and 2 increases up to the current $I_0$ the value of which exceeds the amplitude of the alternating current $I_{max}$ which normally flows through the limiter and which is smaller than the short circuit current. When the current in the throttles 1 and 2 has increased to $I_0$, the current through the transistors 3 and 4 changes during normal operation over a period of the alternating current in accordance with the following equations (1):

$$I_3 = I_0 + I_{max} \sin(\omega t + \Phi_0),$$

$$I_4 = I_0 - I_{max} \sin(\omega t + \Phi_0),$$

The current through the throttles remains unchanged $I_0$.

Figure 4:
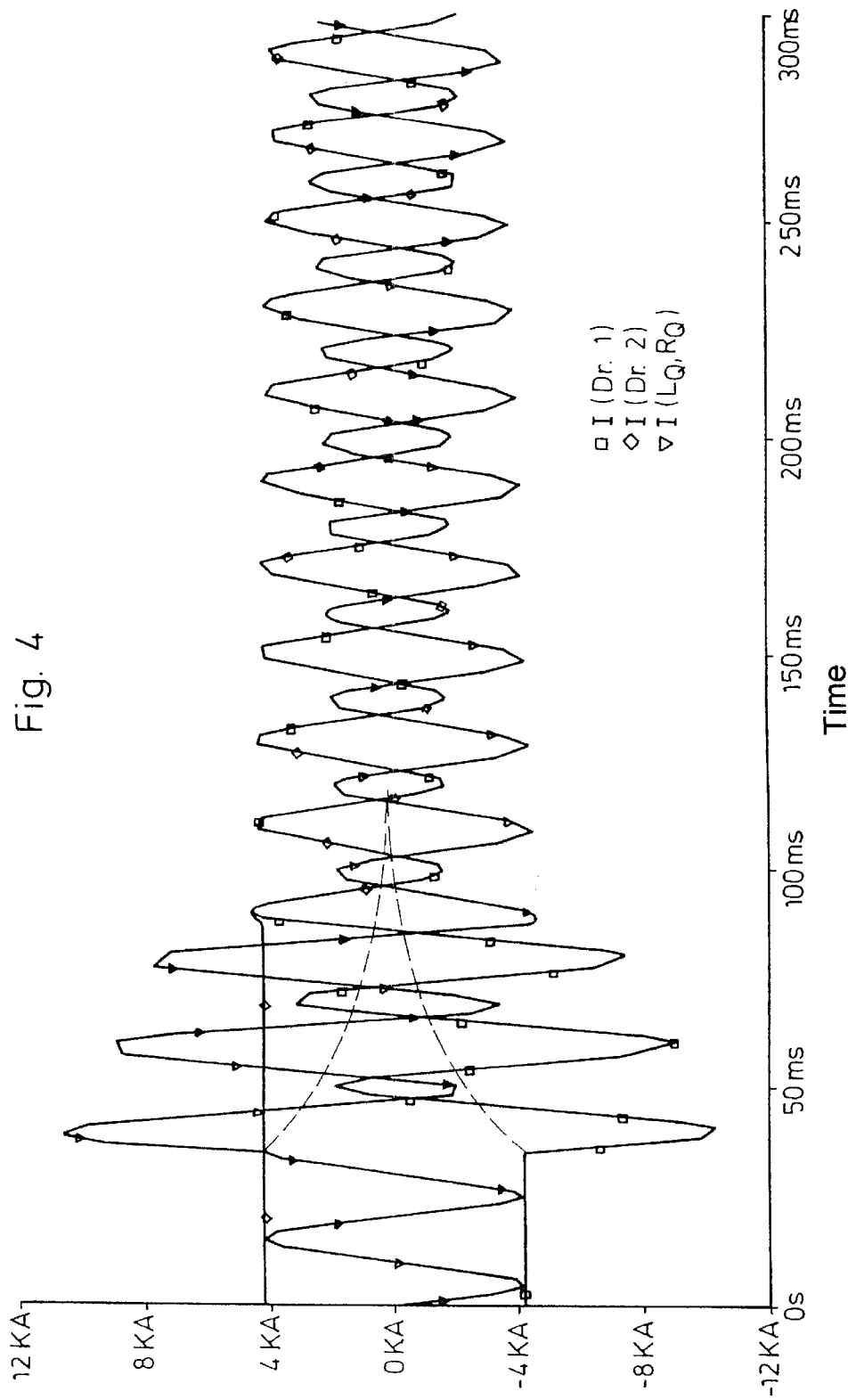
FIG. 4 shows the current flowing in the elements of the current limiter over time.

Upon occurrence of a short circuit, first one of the thyristor blocks (becomes non-conductive), for example, thyristor 3 since the voltage at the thyristor is reversed. If the period during which a reversed voltage is effective on the thyristor 3 is equal or greater than the time for the restitution of the electrical strength of the thyristor 3 as it is shown in FIG. 4, the thyristor remains in that state; otherwise, a similar situation develops with the thyristor 4. Then the current in the throttle 1 increases and finally exceeds the value $I_0$. For the period during which only the thyristor 3 is blocking the input voltage is:

$$U = U_{max} \sin(\omega t + \psi_{01})$$

and the current in the throttle 1 can be determined by the following equation:

$$I_1 = (U_{max}/\omega L_1) \times \sin(\omega t + \psi_1) - (U_{max}/\omega L_1) \times \sin \psi_1 \cdot e^{-t/96\ 1} + I_0 \times e^{-t/\tau}) \quad (2)$$

wherein $\psi_{01}$ is the phase angle, which is defined by the blocking point in time of the thyristor 3, $\psi_1$ is the phase angle, which is defined by the point in time of blocking of the thyristor 3 and $L_1/R_1$ with $$\psi_1 = \psi_{01} - \Phi_1,$$

so that $$\Phi_1 = \arctan(wL_1/R_1)$$

$R_1$ is the resistance of the shorted circuit, $L_1$ is the inductivity L of the throttle 1 or respectively, the throttle 2 plus the source inductivity $L_Q$ $\tau_1 = L_1/R_1$ is the time constant.

In this period, the current through the transistor 4 changes in accordance with the following equation:

$$I_4 = I_{L1} + = (U_{max}/\omega L_1) \times (\sin(\omega t + \psi_1) - \sin \psi_1 \times e^{-t/\tau 1}) + I_0 \times (1 + e^{-t/\tau}) \quad (3)$$

and the current in the throttle remains practically unchanged $I_0$. As can be seen from equation (3), the current in the shorted circuit increases in the opposite direction up to the value $I_0$.

With the fulfillment of the condition $|I_1| \geq |-I_0|$, a reversed voltage is also applied to the second valve 4, whereby the second valve 4 becomes non-conductive. If the period, during which a reversed voltage is effective on the thyristor 4, is equal or greater than the time for the restitution of the strength of the thyristor, the thyristor 4 remains in a blocking state. Otherwise, this situation occurs later in one or several alternating current periods.

For the period during which both thyristors are blocked with the input voltage $$U=U_{max} \sin(\omega t+\psi_{02}),$$

the current in the throttles 1 and 2 can be determined by the following equation:

$$I_1=I_2=(U_{MAX}/\omega L_2)\times(\sin(\omega t+\psi_2)-\sin \psi_2\times e^{-t/\tau 2})-I_0\times e^{-t/\tau 2} \quad (4)$$

wherein:

$$L_2=2L+L_Q \text{ and } \tau_2=L_2/R_2.$$

$R_2$ is the resistance of the shorted circuit with two throttles arranged in series, $\psi_{02}$ is the phase angle; it is defined by the blocking time of the thyristor 4, and $\psi_2$ is the phase angle, which is defined by the blocking time of the thyristor 4 and also $\omega L_2/R_2$, that is $$\psi_2=\psi_{02}-\Phi_2 \text{ with } \Phi_2=\arctan(\omega L_2/R_2).$$

The period between the occurrence of the short and the closing of the first valve can vary between about 0.5 ms and about 20 ms depending on the phase position $\psi_{01}$ and the dimensioning of the current limiter.

The time from the blocking of the first thyristor to the blocking of the second thyristor may vary between about 3 ms and about 260 ms depending on the phase position $\psi_{02}$ and the dimensioning of the elements of the current limiter. When both thyristors are in a blocking state, the short circuit current is determined by the two throttles arranged in series. As apparent from FIG. 4, the short circuit current increases to 2 to 3 times the value of $I_{max}$ during the period in which only one thyristor is blocked. After the blocking of the second valve, the amplitude of the current drops to a value in the vicinity of $I_{max}$, that is, in the particular example, even down to a value which corresponds practically to normal operation.

Figure 2:
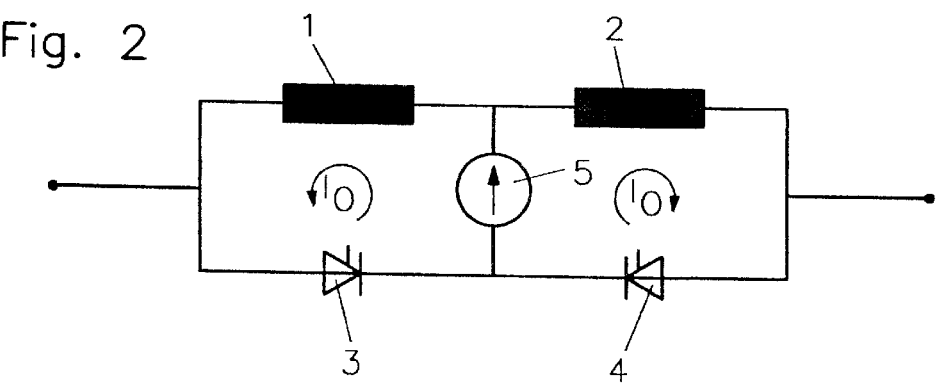
FIG. 2 shows the current limiter with a voltage source connected between the connection of the valves and the connection between the throttles.
Figure 3:
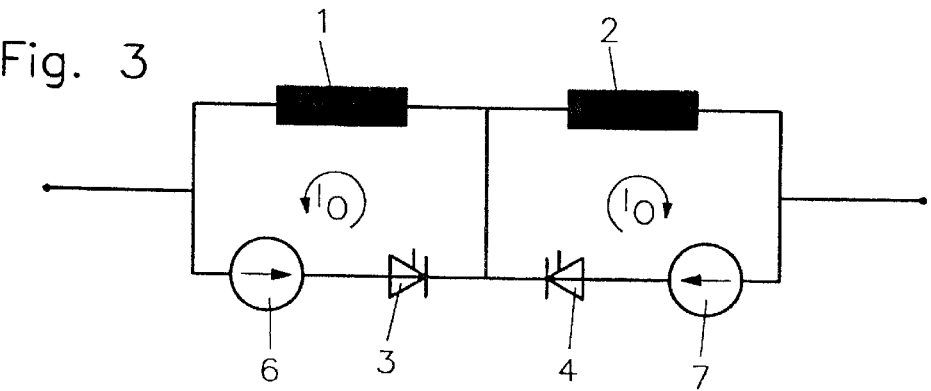
FIG. 3 shows the current limiter with two voltage sources.

The current limiter with the two thyristors as shown in the circuit of FIG. 2 or 3 will be examined below on the basis of a specific construction. The dimensions of the components of the current limiter and the parameter of the energy transmission line and the load are as follows:

| Source voltage | $U_{max}$ = 410 kV |
| Ohmic resistance of the source | $R_Q$ = 0.24 Ω |
| Inductive resistance of the source | $L_Q$ = 6 mH |
| Ohmic resistance of the load | $R_L$ = 100 Ω |
| Inductivity of the throttle 1 | L = 0.2 H |
| Inductivity of the throttle 2 | L = 0.2 H |

FIG. 4 shows the currents over time, which flow through the throttles 1 and 2 and through the protective circuit, which shorts the throttle 2. In this case, the amplitude of the current during a short in the load exceeds the normal current by about 2.7 times. About 50 ms after the occurrence of the short circuit, a stage is reached in the current limiter wherein the current is practically equal to the normal current. The transition to the current limiting regime occurs automatically without any external control signals for the thyristors 3 and 4. The current limiter triggers itself passively on the basis of the fault condition.

In order to show the effectiveness of the current limiter including thyristors, the current limiter is compared with a limiter comprising the same components wherein however diodes are used as the uncontrolled valves.

Figure 5:
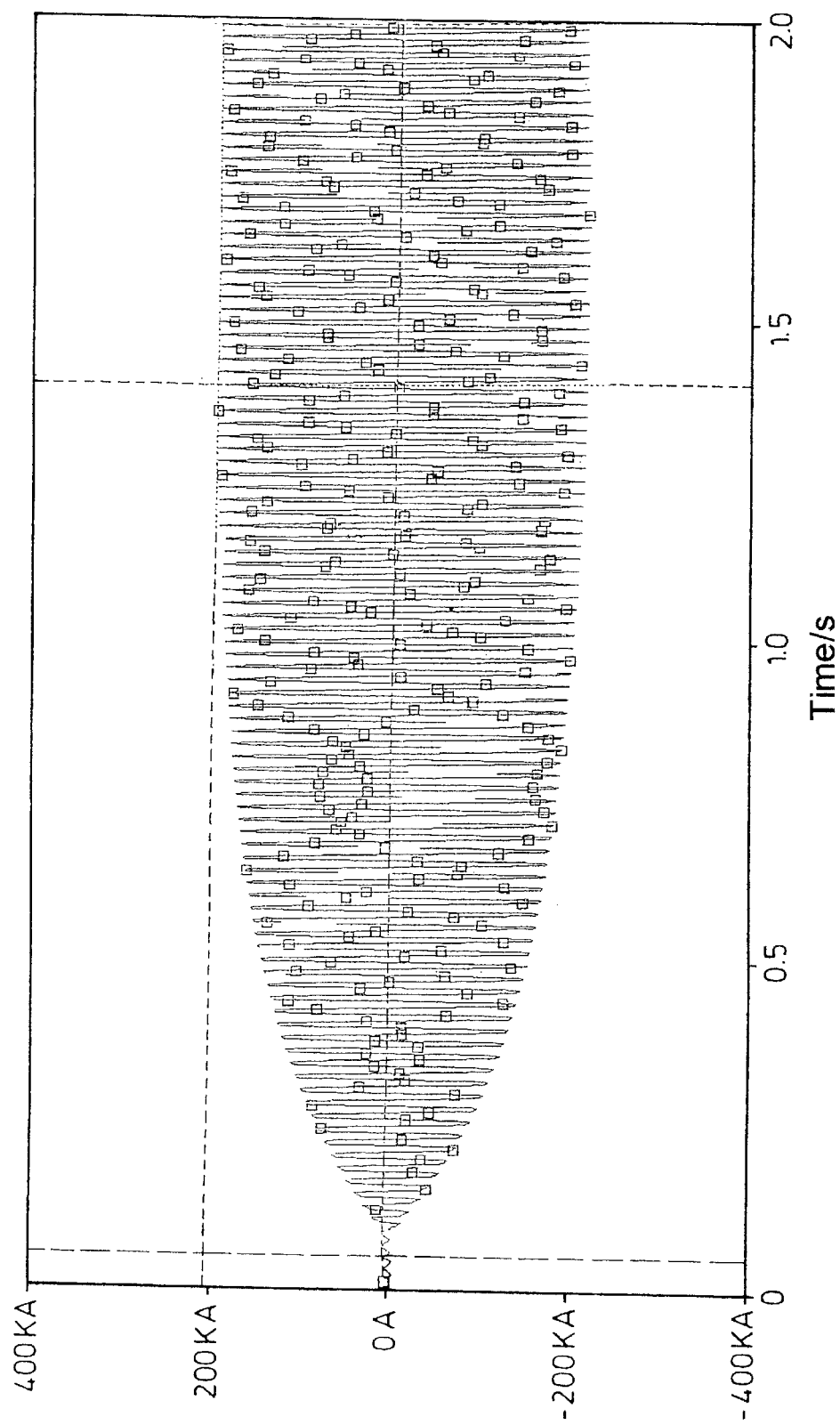
FIG. 5 shows the fault current over time in a current limiter with uncontrolled valves.
Figure 6:
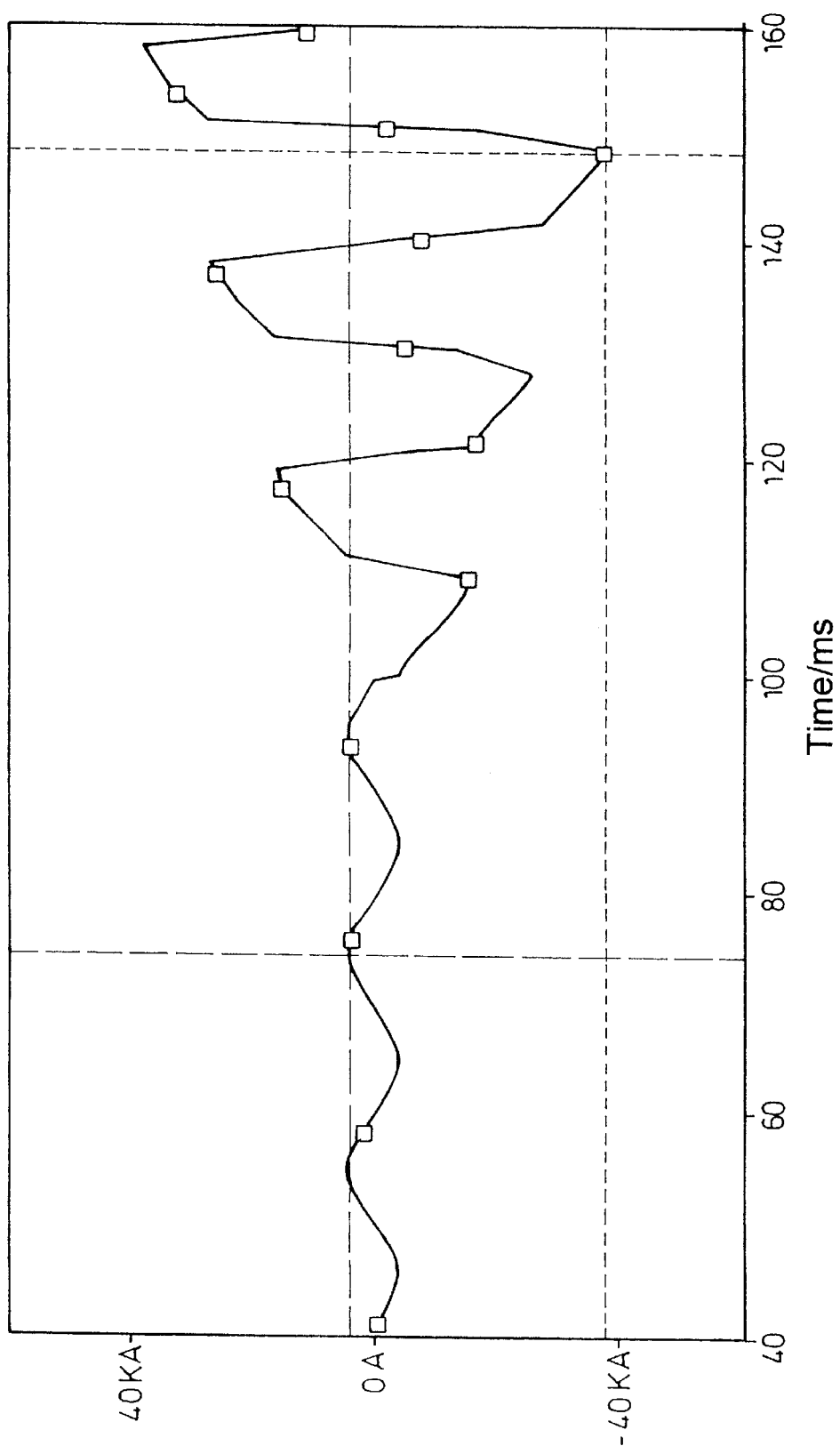
FIG. 6 shows an initiation window of the fault current.

The result is shown in FIG. 5 with a large time window of 2 sec. And in FIG. 6 with a small time window of 160 ms around the point of time at which the fault current occurs. A comparison of the curves of FIG. 4 and of FIG. 5 shows that, with the same parameters of the circuit including the inductivity of the throttles 1 and 2, the current through the circuit to be protected is 150 ms after occurrence of the short 9 times smaller and, after 1.5 sec, 50 times smaller in the inventive arrangement using thyristor than it is with th use of diodes. If the faulted circuit is shut down after 2 sec or later, the effectiveness of the current limiter with thyristors is even greater.

Another examination shows that, with the use of diodes as valves in the current limiter wherein the inductivity of the throttles is increased to such an extent that a current limiting capability is obtained corresponding to that obtained with the current limiter according to the invention including thyristers, the inductivity of the throttles must be increased from 0.2 H to 20 H. This is a value two orders of size larger.

In order to secure the response selectivity of the protective device during a short circuit, a delay for the switching off of the power supply of 1.5 to 2 sec is necessary. With such a switching off delay, the current limiter according to the invention has a total energy capacity of the current limiting throttles by more than two orders of size lower than with current limiters including diodes. In the conception and realization, this is an economically important advantage.

What is claimed is:

1. A current limiter with electric valves for limiting a short circuit current in an electric power supply circuit, comprising:

two inductivities, throttles, connected in series, two valves connected in series and arranged in opposition to each other in a circuit parallel to said series-connected throttles, and a connection between a common potential point of said valves with a common potential point of said throttles, said valves being semi-controlled valves, which, upon initial operation of the current limiter, are activated by an external control for a transfer from a conductive to a blocking state in which they remain so that the current limiter automatically limits the current upon occurrence of a fault when a predetermined current threshold is exceeded.

2. A current limiter according to claim 1, wherein said two valves are thyristors.

3. A current limiter according to claim 1, wherein said connection of the common potential point of the valves and that of the throttles includes a controllable voltage source.

4. A current limiter according to claim 1, wherein a controllable voltage source is connected in series with each valve and in the passing direction of the respective valve and the common potential point of the throttles is directly connected to the common potential point of the valves.

* * * * *